United States Patent [19]

Bessenyei et al.

[11] Patent Number: 5,122,719

[45] Date of Patent: Jun. 16, 1992

[54] METHOD AND APPARATUS FOR REDUCING RECURRENT FLUCTUATIONS IN MOTOR TORQUE

[75] Inventors: Bela Bessenyei; Thomas Niertit, both of Webster, N.Y.

[73] Assignee: Eastman Kodak Company, Rochester, N.Y.

[21] Appl. No.: 661,369

[22] Filed: Feb. 27, 1991

[51] Int. Cl.⁵ .................................................. G05B 5/01
[52] U.S. Cl. ..................................... 318/629; 318/602
[58] Field of Search ............ 318/254, 430, 432, 437, 318/439, 569, 600, 601, 602, 603, 629

[56] References Cited

U.S. PATENT DOCUMENTS

| | | | |
|---|---|---|---|
| 3,919,609 | 11/1975 | Klautschek et al. | 318/227 |
| 4,219,767 | 8/1980 | Wimmer | 318/696 |
| 4,240,020 | 12/1980 | Okuyama et al. | 318/721 |
| 4,242,619 | 12/1980 | Nakamura et al. | 318/314 |
| 4,259,698 | 3/1981 | Takada | 360/70 |
| 4,287,458 | 9/1981 | Nakamura et al. | 318/341 |
| 4,395,904 | 8/1983 | Ivanov et al. | 318/617 |
| 4,485,337 | 11/1984 | Sandusky | 318/314 |
| 4,584,512 | 4/1986 | Pritchard | 318/696 |
| 4,600,866 | 7/1986 | Seto | 318/313 |
| 4,626,754 | 12/1986 | Habermann et al. | 318/460 |
| 4,636,696 | 1/1987 | Minakuchi et al. | 318/327 |
| 4,638,221 | 1/1987 | Brignall | 318/48 |
| 4,651,070 | 3/1987 | Truman et al. | 318/139 X |
| 4,806,835 | 2/1989 | Habermann | 318/607 |
| 4,814,678 | 3/1989 | Omae et al. | 318/317 |
| 4,814,683 | 3/1989 | Okamoto et al. | 318/800 |
| 4,825,132 | 4/1989 | Gritter | 318/811 |
| 4,864,209 | 9/1989 | Seki et al. | 318/611 |
| 4,868,477 | 8/1989 | Anderson et al. | 318/696 |
| 4,882,526 | 11/1989 | Iino et al. | 318/561 |
| 4,885,793 | 12/1989 | Tabuchi | 388/810 |
| 4,890,048 | 12/1989 | Hunter | 318/696 |
| 4,912,387 | 3/1990 | Moulds, III | 318/629 |
| 4,940,914 | 7/1990 | Mizuno et al. | 310/326 |
| 4,943,760 | 7/1990 | Byrne et al. | 318/701 |
| 4,947,066 | 8/1990 | Ghibu et al. | 310/49 R |

OTHER PUBLICATIONS

"Drive Scheme Holds Key to DC Motor Performance" by M. B. McCormick, EDN, Jan. 19, 1989 (5-page reprint).
"A Brushless Motor Evaluation" by B. Bessenyei and T. Niertit, Motion, Jul./Aug. 1988, pp. 3, 4, 6-8 and 10.
"The Motorola DSP56000 Digital Signal Processor" by K. L. Kloker, IEEE Micro, Dec. 1986, pp. 29-31 and 46-48.

Primary Examiner—Bentsu Ro
Attorney, Agent, or Firm—Robert L. Randall

[57] ABSTRACT

In a system for compensating predictable periodic speed variations in the electric motor of a velocity servo, which speed variations may include variations at frequencies above the velocity servo bandwidth, circuitry is provided for generating synchronized reference signal frequency components corresponding in frequency to at least one ripple frequency component of the torque. Each of the synchronized reference signal frequency components is adjusted, while the motor shaft is revolving, in phase and amplitude in a sense to reduce the ripple at that frequency in motor speed. Both manual and self-adjusting embodiments are shown, each including real time spectrum analysis of motor torque to guide the phase and frequency adjustments.

10 Claims, 6 Drawing Sheets

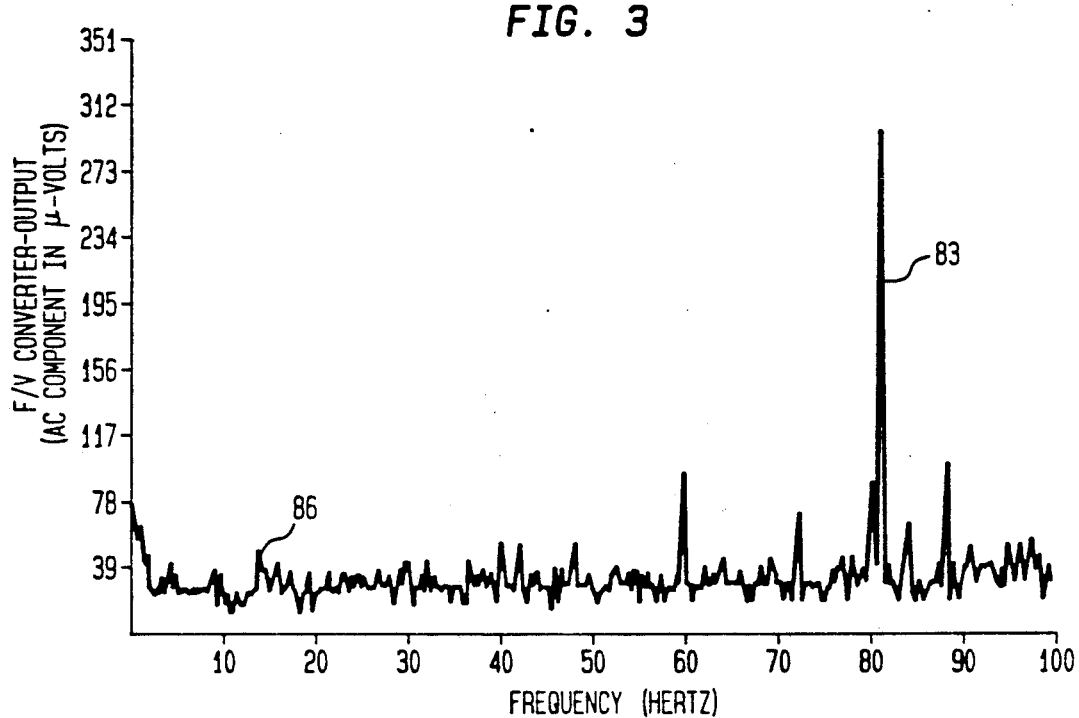
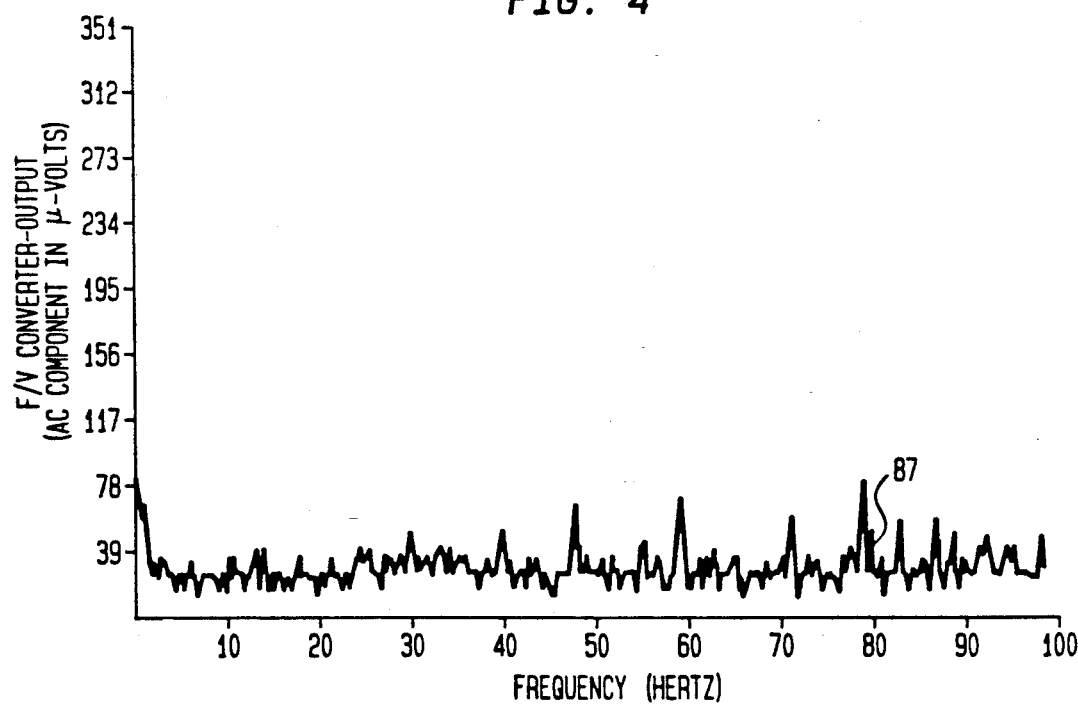

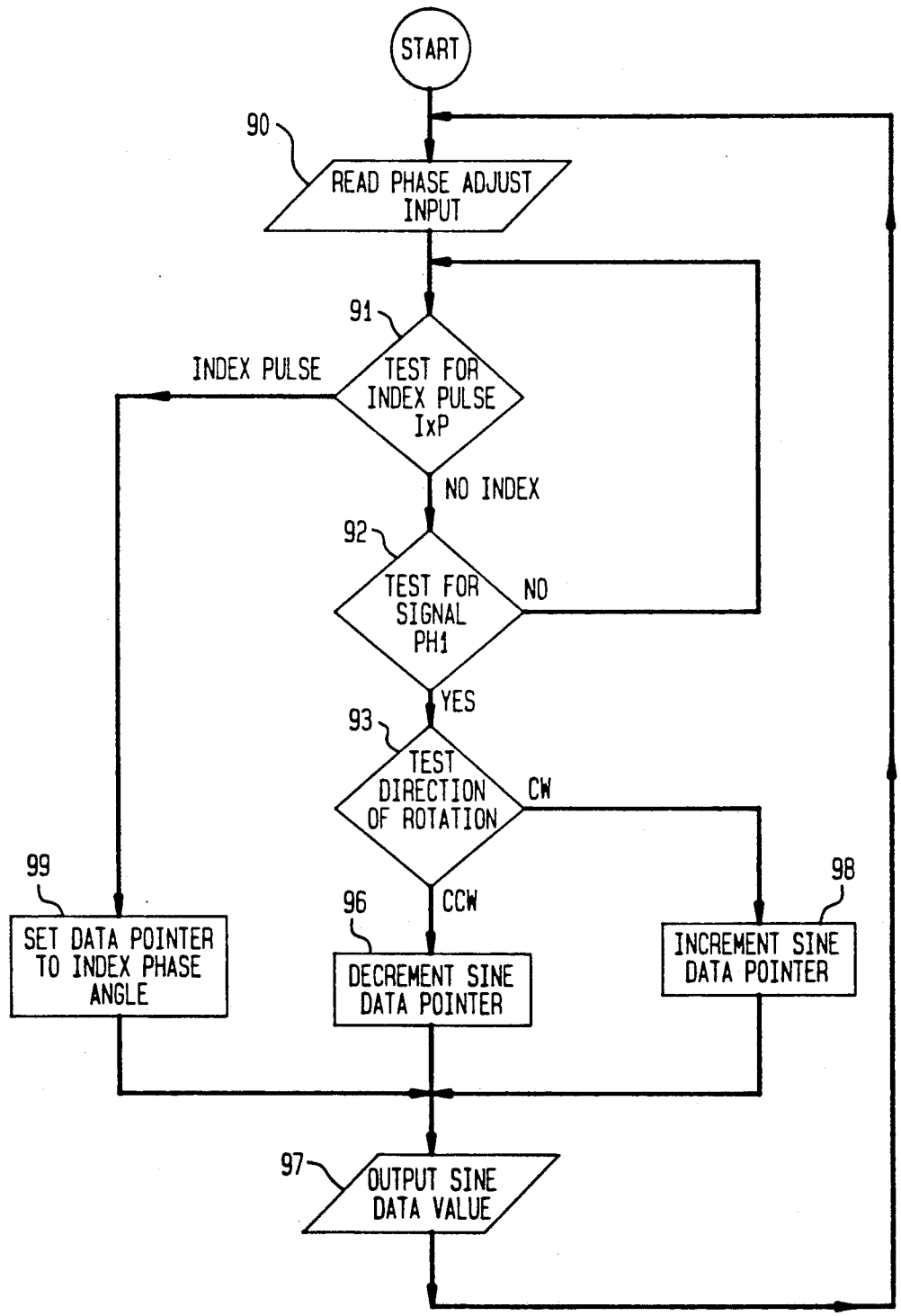

METHOD AND APPARATUS FOR REDUCING RECURRENT FLUCTUATIONS IN MOTOR TORQUE

FIELD OF THE INVENTION

The present invention relates to speed control refinement, by control of torque output from an electric motor, and it relates in particular to compensating for recurrent fluctuations (i.e., ripple) in output torque.

BACKGROUND OF THE INVENTION

Some electric motors are operated at low speeds at which there is an essentially periodic fluctuation, or ripple, in the output torque. Such ripple, one form of which is called "cogging," is primarily due to factors such as unbalanced and/or coarse resolution driving phases or limited numbers of poles on the rotor and/or stator. These kinds of factors give rise to periodic variations in the magnetic field strength in the air gap between cooperating rotor and stator poles as the motor turns and hence to the ripple effect. Torque ripple can also occur as a result of, e.g., irregularities in motor bearings which impose corresponding irregularities in the loading of the motor. Torque ripple is necessarily accompanied by corresponding motor speed variations which also are essentially periodic and at frequencies higher than the motor speed in revolutions per minute (RPM). If the motor is driving, e.g., a coating drum onto which a fluid is being sprayed, the speed fluctuations result in a deposited film which has an undesirable nonuniform thickness.

Electric motor output torque ripple is one of the factors that concerns electric motor system designers. Several aspects of the problem are described in "Drive Scheme Holds Key To DC Motor Performance" by M. B. McCormick, EDN, Jan. 19, 1989. It is said that a motor with sinusoidal commutation has nearly zero torque ripple over a complete revolution of the motor. However, in some applications significant troublesome ripple still remains.

Similarly, in "A Brushless Motor Evaluation" by B. Bessenyei and T. Niertit, Motion, July/August 1988, pages 3, 4, 6-8, and 10, solutions such as balancing the motor currents and adding a high-inertia load are considered. However, significant ripple still remains in some applications. [Note that, due to a typographical error, the figure numbers for FIGS. 5 and 6 in this paper were inadvertently interchanged.]

Flywheels have long been used to smooth torque ripple in the output of various kinds of motors, including electrical motors; but flywheels are bulky, and inconvenient to use for motors operated at speeds below say 100 RPM. Efforts also have been made to combat the torque ripple problem by specific motor structure design techniques, and one example is shown in the U.S. Pat. No. 4,947,066 to B. A. Ghibu et al.

There are many motor control servo systems that use position signals derived from a motor output to control motor speed. In these, any given speed change and correction may take place over the course of multiple revolutions of the motor armature. Two examples are shown in the U.S. Pat. Nos. 4,885,793 to J. Tabuchi and 4,259,698 to S. Takada. Such motor speed control servo systems are typically found in systems in which the motor speed is substantially greater than the recurrence rate of any speed changes of interest. Those systems usually have a relatively slow response which is unable to deal with an application in which there are recurrent speed variations during each revolution of the motor's armature as is the case where torque ripple is a problem.

A number of attempts have been made to reduce the impact of torque ripple by employing electronic circuit means. In U.S. Pat. No. 4,868,477 to F. J. Anderson et al., static drive current measurements are made at each of many angular positions of the motor shaft; and for each torque rating at which the motor is to be operated the current values are stored in read only memories (ROMs) for the respective motor drive current phases. Those values are then read out to provide drive current when the motor is being operated under normal rotational load. This is an awkward and time consuming process which provides compensation in the form of a composite of all torque effects which appear under static conditions. The U.S. Pat. No. 4,943,760 to J. V. Byrne et al. is another of the type that uses static tests to determine a compensating waveform for each phase of motor drive current.

U.S. Pat. No. 3,919,609 to H. Klautschek et al. shows the comparison of actual output torque measurements to a reference torque and use of the difference to correct drive current for reducing ripple. This too involves measurement of gross torque, and its real time style of operation puts a significant premium on dealing adequately with issues of circuit and hardware inertia and time constants. Another torque comparison and current control system is shown in U.S. Pat. No. 4,240,020 to T. Okuyama et al.

U.S. Pat. No. 4,890,048 to L. W. Hunter shows compensation for torque ripple due to motor drive current supply effects by employing an accumulator to dampen hunting caused by the input signal.

SUMMARY OF THE INVENTION

Impact of the torque ripple problem is reduced in accordance with the present invention by the method steps of generating at least one synchronized reference signal at a frequency of at least one frequency component of the torque ripple; combining the synchronized reference signal into an electric current drive to the motor; and adjusting phase and magnitude of the at least one synchronized reference signal, while a shaft of the motor is revolving, to reduce the at least one frequency component.

In one embodiment, apparatus for reducing recurrent speed variations in a velocity servo by reducing ripple in the torque output of an electric motor included in the servo comprises means, responsive to motor output speed and shaft position, for generating a synchronized reference signal at a frequency of at least one frequency component in the recurrent ripple; means for combining the synchronized reference signal, in a ripple reducing sense, into a drive current for the motor; and means for adjusting phase and/or amplitude of the synchronized reference signal to reduce the at least one frequency component.

An embodiment of the synchronized reference signal generating means includes at least one synchronous function generator for generating an alternating current signal wave for controlling speed of an electric motor and comprising means for receiving signals indicating motor shaft position and speed variation; means, responsive to the signals, for generating a digital signal sample train representing an analog signal frequency equal to a torque ripple frequency component in the output of the motor; means for adjusting phase of the sample train in a direction to reduce the ripple frequency; means for converting the phase adjusted sample train to the analog signal; and means for adjusting the amplitude of the analog signal in a direction to reduce the ripple.

In one embodiment, the modified drive current is applied to the motor through amplification means having an open loop bandwidth about an order of magnitude larger than the bandwidth of the servo loop comprising the motor and the speed control circuit.

BRIEF DESCRIPTION OF THE DRAWINGS

Additional insight on various features and advantages of the invention can be obtained from a consideration of the following Detailed Description in connection with the appended claims and the attached drawings in which:

FIGS. 3 and 4 are spectrum analyzer displays illustrating speed variations before and after, respectively, compensation in the system of FIG. 1;

FIG. 5 is a process flow diagram for a synchronous function generator employed in FIG 1;

DETAILED DESCRIPTION

Figure 1:
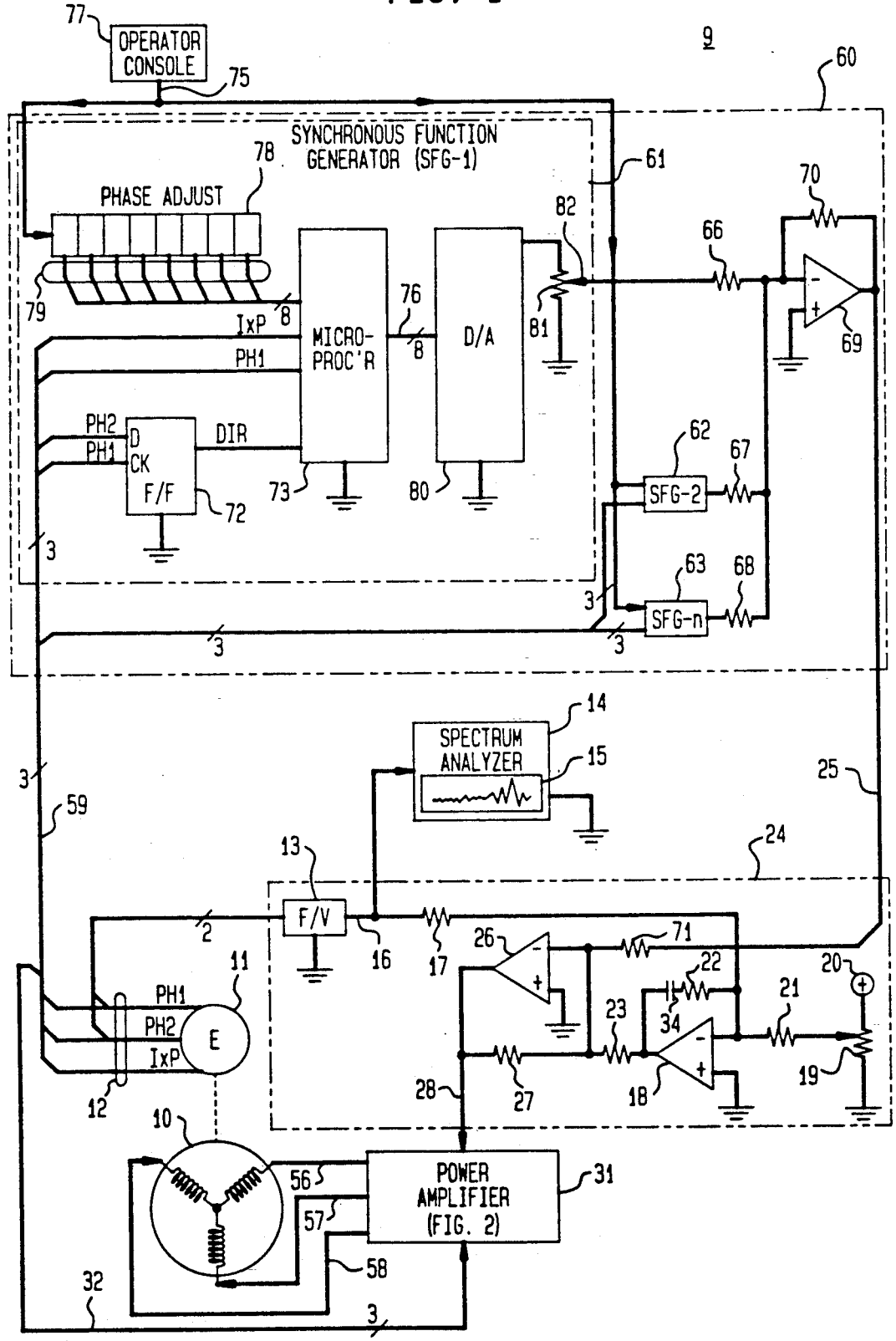
FIG. 1 is a block diagram of a motor speed control system employing the invention for manual adjustment of ripple compensation.

In FIG. 1 there is shown a motor speed control system 9 including manually operated circuitry for compensating for torque ripple in motor output. An illustrative motor 10, for purposes of description, is a brushless direct current (DC) motor operated at 60 revolutions per minute (RPM) and an output torque of 50 foot-pounds. This motor has fourteen pole pairs, and it has 81 slots in the stator into which stator windings are laid. The invention is nevertheless also applicable to electric motors of other types and constructions which are subject to output torque ripple. The schematic representation of motor 10 includes a normal rotational load (not separately shown) which absorbs the mentioned output torque.

An angular position encoder 11 is mechanically coupled to the rotor shaft of motor 10 to provide angular position, speed, and direction of rotation information. Many such encoders are commercially available. The encoder 11 produces an index pulse IxP output on one circuit of a three-circuit bus 12 once per revolution of the motor shaft. In addition two quadrature signals PH1 and PH2 are produced on two other correspondingly designated circuits of the bus 12. PH1 and PH2 are 90 electrical degrees apart in phase and each is illustratively at a frequency of approximately five kilohertz (kHz) when the motor is operating at the mentioned 60 RPM. PH1 and PH2 are usually pulse trains, but alternating current (AC) signals are produced by some encoders and can also be employed. Herein the term "pulse train" is considered to include both the pulse train form and the AC form of signals.

The system 9 includes several other major components, and their interconnection will be briefly outlined prior to considering each in detail. The bus 12 is connected via a three-circuit cable 32 to a power amplifier 31 to provide shaft position information for commutation. A three-phase output of circuit 31 is connected by circuits 56, 57, and 58 to the outer terminals of star-connected stator windings of motor 10 to complete a motor commutation loop. Circuits PH1 and PH2 of bus 12 are also connected to an input of a velocity control circuit 24 (shown within a dashed line rectangle) which has an output connected by way of a lead 28 to a reference input of the power amplifier 31 to form, with that circuit and motor 10, a velocity servo loop. All three circuits of bus 12 are also connected via a three-circuit bus 59 to an input of a torque ripple compensating synchronous reference circuit 60 (shown within a dashed rectangle) which has an output (i.e., a synchronized reference signal) connected by a lead 25 to an input of the velocity control circuit 24.

A spectrum analyzer 14 is connected between a speed indicating output of circuit 24 and ground, and includes a display 15 for real time observation of the frequency spectrum of the output speed of motor 10. Analyzer 14 must have adequate sensitivity to indicate possible frequency components of interest amongst all components present in the circuit 24 speed sensing output.

In operation, the power amplifier circuit 31 determines normal drive current frequency, phase, and amplitude for motor 10 under load. The velocity servo loop including circuit 24 is responsive to the PH1 and PH2 signals from encoder 11 for providing a reference for the power amplifier 31, as modified by output from the circuit 60, for maintaining motor velocity (i.e., speed and direction). The modified reference is a velocity error signal applied on lead 28 to circuit 31 for adjusting the motor drive amplitude to reduce the velocity error.

In general, the arrangement and cooperation of a velocity control circuit, such as circuit 24, and a power amplifier, such as amplifier 31, are known to those skilled in the art. However, to facilitate an understanding of the improvement of the invention, and for the convenience of the reader, the arrangement and operation of the circuits 24 and 31, which together determine the normal operation of motor 10, are here presented briefly in somewhat greater detail.

In circuit 24, application of the two signals PH1 and PH2 to circuit 24 at an input to a frequency/voltage (F/V) converter (i.e., tachometer) 13 provides an unambiguous indication of direction of motor rotation as well as indicating the motor speed. F/V converter 13 produces on an output lead 16 a direct current (DC) voltage that indicates motor velocity.

Lead 16 is connected both to the input of spectrum analyzer 14 and, through a summing resistor 17, to an inverting input connection of a servo pre-amplifier 18, which has its noninverting input connected to ground. A reference speed potentiometer 19 is connected across the terminals of a positive voltage supply 20 which has its negative terminal grounded. A tap on the potentiometer 19 is connected through a summing resistor 21 to the inverting input of amplifier 18. A feedback impedance including, for example, a series connected resistor 22 and capacitor 34 is connected between an output and the inverting input of amplifier 18. The impedance of the resistor 22 and capacitor 34 is advantageously chosen to set the alternating current (AC) gain of amplifier 18 at a level to establish the desired bandwidth of the entire servo loop system of FIG. 1. In the illustrative embodiment that gain is set to establish a servo loop bandwidth of approximately 100 Hertz (Hz). The output of amplifier 18 is an uncorrected error signal e(t) representing the sum of the potentiometer 19 tap current and the F/V converter 13 output current (i.e., including any uncompensated ripple superimposed on the potentiometer reference DC current caused by torque ripple).

Another summing resistor 23 connects that same output error signal e(t) from amplifier 18 to an inverting input of a unity gain summing amplifier 26 which also has its noninverting input connected to ground. A feedback resistor 27 connects the output of amplifier 26 to its inverting input. A further summing resistor 71 connects the output lead 25 of the synchronous reference circuit 60 to the inverting input of amplifier 26. The output signal of amplifier 26 is a ripple corrected error signal E(t) which is a result of interaction of the reference speed control from potentiometer 19, as modified by the tachometer signal from F/V converter 13 and the synchronous reference circuit 60 output. The output of amplifier 26 is connected by lead 28 to the reference input of the power amplifier 31.

Figure 2:
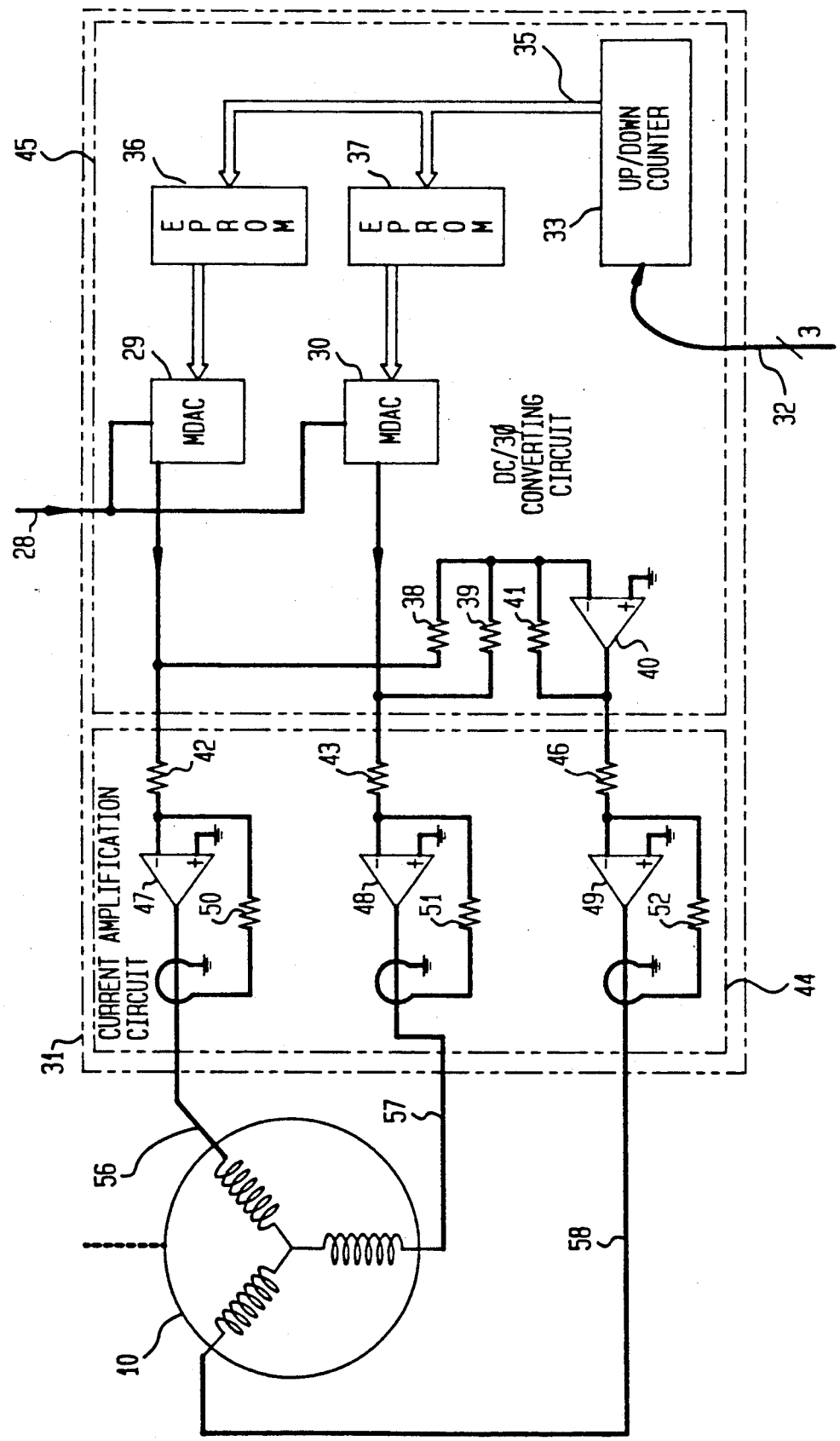
FIG. 2 is a schematic diagram of a power amplifier circuit used in FIG. 1.

That power amplifier 31 is shown in more detail within an outer dashed line rectangle in FIG. 2 and represents one of various ways known in the art for using a DC signal to control a three-phase drive current. Power amplifier 31 is comprised of current amplification circuit 44 shown within an inner dashed rectangle in FIG. 2 and a DC-to-three-phase (DC/3Ø) converting circuit 45 shown within another inner dashed rectangle in FIG. 2.

The DC/3Ø converting circuit includes an up/down counter 33, electrically programmable read only memories (EPROMs) 36 and 37, multiplying digital-to-analog converters (MDACs) 29 and 30, resistors 38, 39, and 41, and an amplifier 40. The bus 12 from encoder 11 (FIG. 1) is extended via bus 32 to input connections of counter 33. Respective input connections are not specifically shown, but typically the index signal IxP circuit of bus 32 is applied to the counter reset input for resetting the counter once in each revolution of motor 10; the PH1 signal is applied to the counting input of the counter; and both of the signals PH1 and PH2 are applied through a direction sensing circuit (included within the schematic representation of counter 33 but specifically shown) to reverse counting direction promptly if the direction of motor operation should be reversed. An example of such a direction sensing circuit will be described subsequently in connection with the circuit 60 in FIG. 1.

Bit-parallel outputs of counter 33 are connected via a bus 35 to address circuit inputs of electrically programmable read only memories (EPROMs) 36 and 37. Counter 33 counts to a suitable level (e.g., 0 to 255) in response to the PH1 signal to address with adequate resolution digitally represented signal samples stored in EPROMs 36 and 37 of one electrical cycle of a sine wave that is read out fourteen times for each shaft revolution of motor 10. The number of electrical cycles per revolution is the same as the number of pole pairs of the motor 10. Samples stored at corresponding addresses in the two memories are those for sine waves 120 electrical degrees out of phase with respect to one another, the samples in EPROM 37 leading those in EPROM 36.

Samples read out of EPROMs 36 and 37 as they are addressed are applied to digital inputs of MDACs 29 and 30, respectively. The resulting analog outputs of those MDACs are connected via summing resistors 38 and 39, respectively, to an inverting input of the amplifier 40 which has its noninverting input grounded. The feedback resistor 41 connects the output of amplifier 40 to its inverting input connection. The amplifier 40 output is the inverted sum of its two inputs from the MDACs 29 and 30; and, as such, it is also a third phase signal, 240 electrical degrees leading with respect to the signal from the MDAC 29. Gain of amplifier 40 is set so that the outputs of amplifier 40 and of MDACs 29 and 30 comprise a balanced three-phase signal to be further amplified for driving motor 10. The lead 28 from velocity control circuit 24 is connected to reference input connections of the MDACs 29 and 30 to apply the corrected error signal E(t) to modify the analog signal output levels of those MDACs and hence of the three-phase drive current for motor 10.

The three-phase signals from MDACs 29 and 30 and amplifier 40 are connected via resistors 42, 43, and 46, respectively, to inverting input connections of current amplifiers 47, 48, and 49, respectively, in the current amplification circuit 44. In addition to those amplifiers and resistors, circuit 44 includes feedback resistors 50, 51, and 52. Those amplifiers comprise, with amplifiers 18 and 26, amplification means responsive to the output of encoder 11 and potentiometer 19 for approximately maintaining motor 11 speed at a predetermined reference speed. The amplifiers 47, 48, and 49 have an open loop bandwidth about an order of magnitude larger than the bandwidth of the velocity servo loop including motor 10 and circuits 24 and 31. Gains of amplifiers 47, 48, and 49 are set to maintain a balanced three-phase drive current to motor 10 with sufficient amplitude to cause the motor to develop the illustrative 50 foot-pounds of torque. Outputs of those amplifiers are sensed by current sensing loops that are connected through feedback resistors 50, 51, and 52, respectively, to the inverting inputs of the respective amplifiers. Outputs of amplifiers 47, 48, and 49 are connected by leads 56, 57, and 58, respectively, to star-connected stator windings of motor 10.

As previously described, the gain of amplifier 18 is set at a level such that the system 9 bandwidth is about 100 Hz. Consequently, the velocity servo loop including circuits 24 and 31, and absent circuit 60, is unable to compensate for torque ripple frequency components which are at or above its band edge. Also, it is unable completely to compensate for some ripple frequency peaks within its bandwidth but at such large magnitudes that the set gain from amplifier 18 is unable to compensate fully. It will be shown, however, that by applying compensating synchronized reference signals from circuit 60 into the velocity servo loop after amplifier 18 (i.e., to modify the uncorrected error signal) advantage is taken of the broadband amplifiers in the power amplifier 31 to modify the drive to motor 10 for compensation. With that configuration, compensation becomes possible as to ripple frequency components both within and outside the system bandwidth.

Consider now the synchronous reference circuit 60 in FIG. 1. Another three-circuit bus 59 extends the output bus 12 of encoder 11 to circuit 60 and to inputs of each of at least one synchronous function generator (SFG) in that circuit. Three SFGs 61, 62, and 63 are shown for purposes of illustration; and they are further designated SFG-1, SFG-2, and SFG-n to indicate that the number of such generators provided is arbitrary and depends upon the number of torque ripple frequency components for which compensation is to be provided. The SFGs are operated to develop from each an output electric signal component at a frequency equal to a different selected torque ripple frequency component. Amplitude and phase of each SFG frequency are adjusted, as will be described, to reduce the corresponding ripple frequency component when the SFG frequency, or frequencies, are combined into the drive current of motor 10. Outputs of the SFGs are connected via summing resistors 66, 67, and 68, respectively, to an inverting input connection of a summing amplifier 69 which has its noninverting input connection grounded. A feedback resistor 70 is connected from the amplifier output to its inverting input to establish adequate gain to achieve compensation. Output of amplifier 69 is connected via lead 25 and the summing resistor 71 to the inverting input connection of the summing amplifier 26 as earlier described.

The SFGs are advantageously of the same design, except for their respective frequency assignments; so details of only one, SFG 61, need be described. In each SFG, the PH1 and PH2 circuits of bus 59 are connected to clock and data inputs, respectively, of a D-type flip-flop (bistable) circuit 72 to develop a high logic level output signal for one direction of motor rotation and a low logic level output signal for the other direction of rotation. An output (DIR) of flip-flop 72 is connected to an input of a microprocessor 73 which is programmed to produce on an 8-bit output bus 76 a train of digitally encoded sample amplitude values of a sine wave having a predetermined frequency (i.e., the frequency of a selected torque ripple frequency component). Microprocessor 73 includes in its schematic representation the usual well known elements such as an arithmetic logic unit, program and data memory, general and special purpose registers, and input/output connections (ports), all operatively interconnected by data and address busses.

Circuits IxP and PH1 of bus 59 are connected to additional inputs of microprocessor 73 to supply motor shaft position information and sample rate information to be used in producing the microprocessor's output frequency signal just mentioned. To that end, there is stored in memory of microprocessor 73 a set of digital binary coded sample amplitude values representing a suitable number of cycles of a sine wave at the frequency of a selected torque ripple frequency component in the output of motor 10.

An operator console 77 (including, e.g., a keyboard) is provided to facilitate operator interface to an 8-bit phase adjusting register 78 in the SFG. Register 78 is usually a special purpose register in microprocessor 73 and accessed via a communication port and register, also within the microprocessor. Register 78 is shown outside the microprocessor for the convenience of the reader, and the circuit 75 connecting console 77 to the register 78 in each SFG is just the usual user command interface. Bit-parallel output from register 78 is applied by an eight-bit bus 79 to yet another input of microprocessor 73. The digital data output of the microprocessor is applied by bus 76 to a digital-to-analog (D/A) converter 80, and the analog output of the D/A converter 80 is applied to one end of a potentiometer 81 which has its other end grounded. An output tap 82 on the potentiometer is advantageously available to an operator for adjustment to select the SFG output voltage amplitude, and the tap is connected through summing resistor 66 to the inverting input of summing amplifier 69. As an alternative to manual amplitude control via tap 82, of course, the microprocessor 73 can be programmed to conduct the digital waveform samples through its arithmetic logic unit (ALU) for which the operator at console 77 can key in amplitude modification commands and data as required.

Considering the operation of the torque ripple compensating aspect of the system 9, including synchronous reference circuit 60, of FIG. 1, it has been found that relatively easy and precise compensation of motor output for at least one frequency component of torque ripple is achieved in a drive current adjusting method which includes the steps of:

synchronously (i.e., during dynamic motor operation) generating an alternating voltage signal at a frequency of that at least one component, combining the at least one generated voltage signal into the drive current of the motor, and adjusting the phase and amplitude of the generated current signal to values that reduce the amplitude of the at least one frequency component in the output torque.

One way of implementing the aforementioned method is represented by the compensating feedback circuit 60 of FIG. 1.

The frequency, or frequencies, of torque ripple can be determined in several ways. Ripple frequency data is sometimes available from the manufacturer of a motor. At least one type of ripple can also be determined empirically as a function of the structure (e.g., numbers of poles and slots) of a motor. Torque ripple frequency also can be measured, e.g., by spectrum analysis of motor speed as represented by output voltage variations of an F/V converter. The latter method is preferred because it provides direct information about ripple component frequencies and magnitudes; so one need not take into account possibilities for variations due to manufacturing tolerances. This measurement is carried out in real time while the motor shaft is revolving, and there is no need for a special static test set up which might be unique to a particular size or type of motor.

In accordance with the embodiment of FIG. 1, motor 10 is operated at the desired speed and torque output while observing the spectrum analyzer display 15. FIG. 3 depicts the frequency spectrum of the AC component of F/V converter 13 output voltage (in microvolts) versus frequency (in Hertz) produced for the illustrative motor when operating at 60 RPM without benefit of torque ripple compensation. A peak 83 at 81 Hz corresponds to the motor structural feature of 81 slots for stator windings, and it shows at about 290 microvolts. Numerous other peaks are present, including a peak 86 of about 40 microvolts at 14 Hz corresponding to the ripple affect of the aforementioned fourteen poles; but in the illustrative application those other peaks were not of sufficient magnitude to warrant compensation.

Figure 6:
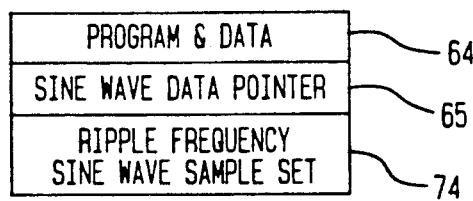
FIG. 6 is a partial memory map for a microprocessor in a synchronous function generator employed in the system of FIG. 1.

To institute compensation, first the microprocessor 73 of each SFG is initialized. A partial map of the microprocessor memory is shown in FIG. 6 and includes a Program and Data area 64, a Sine Wave Data Pointer area 65, and a Ripple Frequency Sine Wave Sample Set area 74. Digital sample values in sufficient number to define a sine wave of adequate resolution, at the 81 Hz ripple frequency when addressed at the frequency of the encoder output signal PH1, are stored in the Ripple Frequency Sine Wave Sample Set Area 74 (hereafter just Sample Area) of memory in microprocessor 73. A Sine Data Pointer (hereafter just Pointer) is set to a predetermined initial value (e.g., the first, positive-going zero-crossing, sample, value address) and is stored in the pointer area 65. The phase adjust register 78 is initially set to zero. If more than one ripple frequency is to be compensated for, the microprocessors 73 of other SFGs are similarly initialized. Operation is executed with each microprocessor following the routine indicated in the process flow diagram of FIG. 5, and the operator addressing each in turn to perform a successive approximation method for minimizing each ripple frequency of interest in the motor output.

In FIG. 5, the microprocessor input from the phase adjust register 78 is read at step 90. At step 91 a test is made for the presence of the index pulse IxP. If there is no pulse, a further test is made at step 92 for the presence of the pulse train signal PH1. If PH1 is absent also, the process loops back to step 91 and continues testing and looping until either IxP or PH1 is detected. If PH1 is detected first, another test is made at step 93 for the direction of rotation of the motor (as indicated by output of flip-flop 72). If the direction is counter clockwise (CCW), the Pointer is decremented at step 96, and the corresponding Sample Area address is read out, at step 97, to bus 76 (in FIG. 1). If the direction is clockwise (CW), the Pointer is incremented at step 98, and the corresponding Sample Area address is read out, at step 97 as before. After readout, the process loops back to step 90.

If in step 91, the index pulse IxP is detected, the pointer is set, in step 99, to the value indicated when the phase adjust register had been read in step 90. Since the index pulse occurs once per shaft revolution, as previously noted, the pointer is refreshed (wiping out the effect of any previous decrementing or incrementing in step 96 or step 98) at that rate. Similarly, if the operator had inserted a phase adjustment value into register 78, that is the value to which the pointer is set on occurrence of the index pulse; and that is the Sample Area 74 address at which readout is restarted.

The operator puts new phase adjustment values into register 78 to minimize, or at least reduce, the peak 83 in the spectrum analyzer display shown in FIG. 3. When no further reduction can be realized by further phase changes, the potentiometer tap 82 is adjusted to reduce the peak magnitude further; and phase and magnitude adjustments are successively repeated while observing the display 15 to minimize, or at least reduce to an acceptable level, the ripple peak magnitude. If more than one ripple frequency component is to be compensated, the adjustment process is repeated for each corresponding SFG; and, if necessary, adjustments of all SFGs are thereafter further refined successively to achieve an improved (i.e., lower ripple peak magnitude) result. When compensation adjustment has been completed, the system 9 continues to operate using the new SFG adjustment values of phase and magnitude. Usually no further change in compensation adjustment is required until significantly different operating conditions occur. Then compensation magnitude and phase adjustments are repeated as may be necessary.

FIG. 4 illustrates the spectrum analyzer display (i.e., F/V converter output AC component in microvolts versus frequency in hertz) for operation of motor 10 after compensation for the 81 Hz peak 83 as just described. The reduced peak, now designated 87, has been reduced to about 75 microvolts and is within the magnitude range of the previously mentioned other peaks that do not require compensation for the illustrative embodiment. In fact it is evident that the 81 Hz peak is now smaller than the adjacent 80 Hz peak. It is also observed that some of those other peaks (e.g., at about 60 Hz and 88 Hz) in FIG. 3 are also smaller in FIG. 4.

Figure 7:
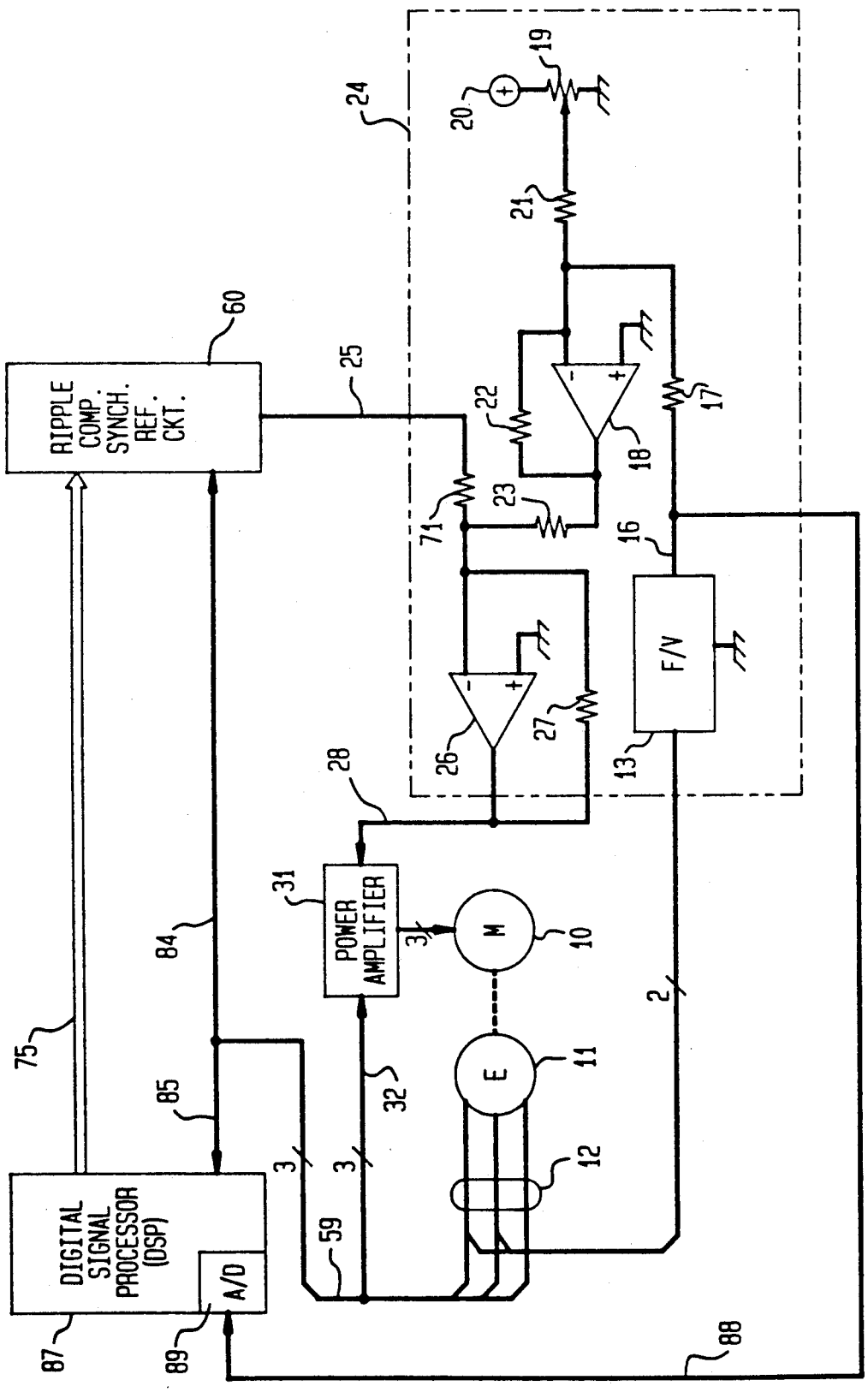
FIG. 7 is a simplified block diagram of a self-adjusting compensation embodiment of the invention.

FIG. 7 illustrates a modified system that one might implement to realize a self-tuning embodiment of the invention. Self tuning eliminates the need for direct operator intervention in the successive approximation process of torque ripple compensation. Where circuit elements in FIG. 7 are the same as those in FIG. 1 the same reference characters are applied in FIG. 7.

A digital signal processor (DSP) 87 replaces the spectrum analyzer and most of the operator functions. DSPs are now well known in the art as devices which can be programmed to perform plural complex operations essentially simultaneously. One commercially produced DSP is described in "The Motorola DSP56000 Digital Signal Processor" by K. L. Kloker, *IEEE MICRO*, December 1986, pages 29-31 and 46-48. The Kloker paper notes at page 46 the capability of a DSP to execute the fast Fourier transform which is widely used in signal processing to perform spectral analysis of time-domain data.

A lead 88 connects the output of the F/V converter 13 on lead 16 to an analog-to-digital converter portion 89 (herein A/D converter 89) of the DSP 87 to supply motor speed information. Bus 59 includes two 3-circuit branches 84 and 85 which supply index pulses IxP and the quadrature phased signals PH1 and PH2 to the ripple compensating synchronous reference circuit 60 and to the DSP 87, respectively. A further bus 75 couples phase and amplitude control data from DSP 87 to circuit 60.

The amplitude control potentiometer tap 82 in each SFG (FIG. 1) of circuit 60 is advantageously set to a suitable, e.g., midrange, value; and the phase adjust register 78 (FIG. 1) is expanded (expansion not specifically shown) to accommodate both phase and amplitude adjustment digital values to be received from DSP 87. Likewise the program of the microprocessor of each SFG is modified, as previously remarked, to direct phase adjusted sine wave sample values being read out through its ALU where amplitude adjustments, directed by the DSP 87, are executed prior to outputting the sample values to bus 76 (FIG. 1) and D/A converter 80 (FIG. 1).

Figure 8:
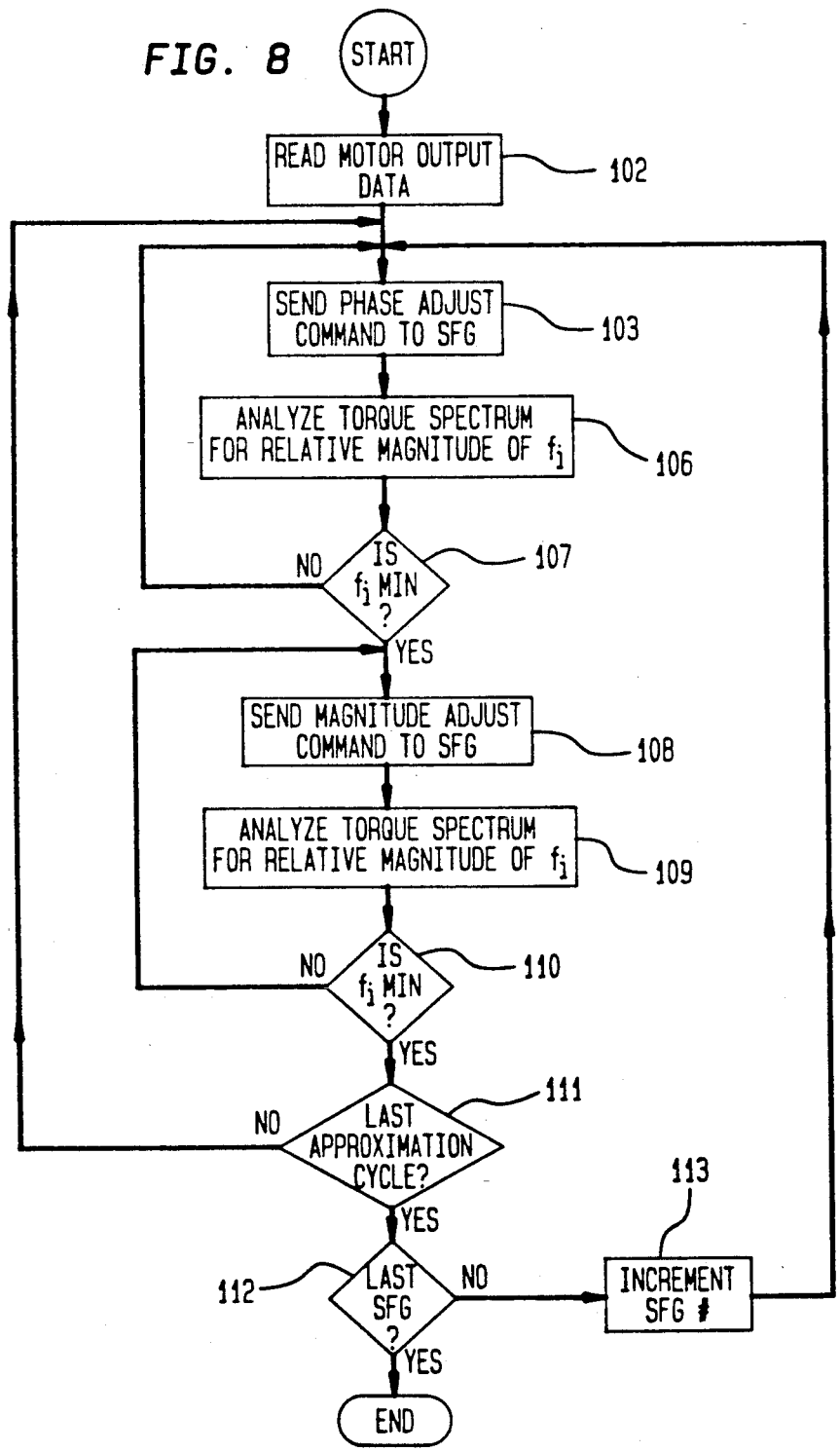
FIG. 8 is a process flow diagram for a digital signal processor employed in the embodiment of FIG. 7.

DSP 87 could be programmed to analyze initially the frequency spectrum of the output of its A/D converter 89, select voltage peaks at frequencies in a predetermined frequency range of interest and with magnitudes exceeding a predetermined threshold, compute appropriate sine wave sample sets for the selected frequencies, and communicate the respective sample sets to microprocessors 73 of SFGs in circuit 60 for storage in their memory sample areas. However it is instead assumed, for convenience of description of the illustrative embodiment, that a user of the system is to be provided with identification of frequencies for which compensation is to be determined. Accordingly, the ripple frequencies of interest are assumed to have been predetermined and appropriate sine wave sample sets stored in the memories of the respective SFGs of the ripple compensating feedback circuit 60 as previously described. It then remains only for the DSP 87 to perform recurrent spectrum analyses of the output of F/V converter 13 and direct the SFGs in the manner of phase and amplitude adjustments to be made for successively approximating the compensating feedback sine waves. An illustrative process for that operation is shown in FIG. 8 in terms of a ripple frequency component $f_i$, which is an arbitrary one of n torque ripple frequency components where $n \geq 1$. Of course, during the entire process the shaft of motor 10 is revolving as was the case for the operation described in regard to FIG. 1.

At the outset, DSP 87 reads motor output data (i.e. encoder output signals PH1, PH2, and IxP on bus 85 and F/V converter 13 output signal on lead 88) as indicated in block 102 of FIG. 8. Also, at this point data are stored in the DSP to indicate, e.g., the number and frequencies of the ripple frequency components that are to be reduced. Also a memory location in the DSP is designated as an "SFG #" register for holding the number of the SFG currently being adjusted, and that register is initially set to 1. A phase adjustment command, and adjustment data (if any), are sent to SFG-1 in circuit 60 as per step 103.

New phase and amplitude adjustment commands received from the DSP are executed when received, thereby modifying motor drive current as previously described and causing appropriate changes in any subsequent spectrum analysis executed by the DSP. This adjustment function is carried out in the relevant SFG of circuit 60 essentially as shown in FIG. 5 except that now the output sine data value from the step of block 97 includes any amplitude adjustment directed because the data value is routed through the ALU for amplitude modification as it is being read out.

The next step, in block 106 of FIG. 8, is to analyze the motor output torque spectrum for the relative amplitude of the ripple frequency component $f_i$. Next the $f_i$ peak magnitude is tested, at decision block 107, to determine whether or not a minimum value has been attained (i.e., is current magnitude of the $f_i$ peak approximately the same as or more than the last prior measured value?). Alternatively, the test at block 107 could be whether or not a predetermined low threshold value has been reached, below which further compensation is not required. The minimum value test is the one used here for purposes of description. If a minimum has not been reached, the process loops back to repeat steps at blocks 103, 106, and 107. On each repetition, the analysis step of block 106 includes additional sampling of the motor output data.

If the test at block 107 shows that $f_i$ has attained a minimum, the process moves to block 108; and an amplitude adjustment command and data, if any, are sent to SFG-1. Motor torque output spectrum is analyzed for the relative magnitude of the $f_i$ component peak at block 109, and the magnitude is tested, at decision block 110, as to whether the magnitude has attained a minimum. If the peak at $f_i$ is not a minimum, the process loops back and repeats steps of blocks 108-110 to make further magnitude adjustments. On each repetition of the blocks 108-110, the analysis step of block 109 includes a new sampling of the motor output data. When a minimum has been attained, the process drops out of block 110 to test at decision block 111 whether or not the last approximation cycle has been performed. In practice, it would be determined by trial and error how many repetitions of the entire process from block 103 onward are usually required before no further refining of the compensation is useful. That number, m, then becomes the criterion for the test at block 111. If m cycles have not yet been completed, the process loops back to the step of block 103. If m cycles have been completed, the adjustment process ends for the current SFG-1, and moves on to test at decision block 112 whether or not the last SFG has been adjusted. If not, the value in the SFG # register is incremented at block 113, and the process loops back to repeat the steps of blocks 103 etc. for the new SFG of feedback circuit 60. If the last SFG has been adjusted, the adjustment process ends; and circuit 60 continues to operate with the last phase and amplitude values provided for its SFGs from DSP 87.

Although the invention has been described with respect to particular embodiments thereof, other embodiments, modifications, and applications which will be obvious to those skilled in the art are included within the spirit and scope of the invention.

What is claimed is:

1. A method for reducing recurrent ripple in electric motor output torque and comprising the steps of:
    generating at least one synchronized reference signal at a frequency of at least one frequency component of said torque ripple;
    combining said synchronized reference signal into an electric current drive to said motor, which drive determines motor shaft rotation speed; and
    adjusting phase and magnitude of said at least one synchronized reference signal, while said shaft of said motor is rotating, to reduce said at least one frequency component, said adjusting step comprising the steps of:
        recurrently analyzing the frequency spectrum of said speed of said motor shaft to indicate the extent of presence of said at least one frequency component;
        successively approximating phase and amplitude adjustment values required in said generated at least one signal to reduce the corresponding selected frequency component in said spectrum to at least a predetermined level; and
        modifying said at least one synchronized reference signal, while said shaft of said motor is rotating, by said phase and amplitude adjustment values.

2. A method for reducing recurrent ripple in electric motor output torque and comprising the steps of:
    generating at least one synchronized reference signal at a frequency of at least one frequency component of said torque ripple;
    adjusting phase and magnitude of said at least one synchronized reference signal, while a shaft of said motor is rotating, to reduce said at least one frequency component; and
    combining said synchronized reference signal into an electric current drive to said motor, said combining step comprising:
        storing digitally encoded samples of first and second sets of phase related sine wave alternating current signals, said first set being in a predetermined phase relationship with said at least one synchronized reference signal and said second set being in 120 electrical degrees leading phase relationship with said first set;
        recurrently addressing said sets of samples at a rate determined by the speed of rotation of said motor to read them out;
        converting the outputs of said addressing step to analog signal form as first and second analog signals, respectively;

adjusting amplitudes of the outputs of said converting step in accordance with said at least one synchronized reference signal;

combining amplitude adjusted outputs of said amplitude adjusting step to form a third analog signal at 240 electrical degrees leading phase relationship with respect to said first analog signal; and applying said first, second, and third analog signals to said three-phase drive current input connections of said motor, respectively.

3. A method for reducing recurrent ripple in electric motor output torque, said motor being connected in a velocity servo loop including an encoder driven by said motor for maintaining motor velocity approximately equal to a predetermined reference velocity, said method comprising the steps of:

generating at least one synchronized reference signal at a frequency of at least one frequency component of said torque ripple, said generating step including the steps of:

storing for each of said at least one frequency components a set of digitally encoded successive sample values representing a sine wave at the frequency of a corresponding one of said at least one frequency components; and reading said sample values out at a rate which is a function of an output of said encoder thereby forming a digital sample value signal train representing each said sine wave;

combining said synchronized reference signal into an electric current drive to said motor; and adjusting phase and magnitude of said at least one synchronized reference signal, while a shaft of said motor is rotating, to reduce said at least one frequency component, said adjusting step comprising the steps of:

providing for each of said digital signal trains a sine wave phase adjustment value as an initial address pointer for reading said sample values of said digitally encoded sample value set for that one component;

receiving from said encoder a motor shaft position indexing signal and at least a first and a second quadrature related pulse train signal waves at a single frequency which is much higher than the recurrence rate of said indexing signal;

reading said pointer;

testing for the presence of said indexing signal, and if it is not present, testing for the presence of said first pulse train signal, if said first pulse train signal is not present, repeating said testing step for said indexing signal; and if said first pulse train signal is present, testing the direction of motor rotation as indicated by said first and second pulse train signals, and incrementing or decrementing said pointer depending upon the result of said direction testing step;

outputting said stored value from the storing step address indicated by the new value of said pointer; and repeating said reading, testing, and outputting steps.

4. A method for reducing recurrent ripple in electric motor output torque, said motor being connected in a velocity servo loop including an encoder driven by said motor for maintaining motor velocity approximately equal to a predetermined reference velocity, said method comprising the steps of:

generating at least one synchronized reference signal at a frequency of at least one frequency component of said torque ripple, said generating step including the steps of:

storing for each of said at least one frequency components a set of digitally encoded successive sample values representing a sine wave at the frequency of a corresponding one of said at least one frequency components; and reading said sample values out at a rate which is a function of an output of said encoder thereby forming a digital sample value signal train representing each said sine wave;

combining said synchronized reference signal into an electric current drive to said motor; and adjusting phase and magnitude of said at least one synchronized reference signal, while a shaft of said motor is revolving, to reduce said at least one frequency component;

said at least one synchronized reference signal generating step produces a plurality of said synchronized reference signals and a corresponding plurality of of said digital signal trains, each at a frequency of a different frequency component of said torque ripple, said at least one synchronized reference signal generating step further compising the steps of:

converting each of said digital signal trains into a corresponding alternating current analog signal; and summing said analog signals to produce a sum signal; and said combining step combines said sum signal into said electric current drive.

5. The recurrent ripple reducing method of claim 4, in which said adjusting step comprises:

recurrently analyzing the frequency spectrum of said output torque to produce a representation of each of said different frequency components of said torque ripple; and recurrently adjusting the amplitude and phase of said analog signal version of said each of digital signal trains to reduce the magnitude of said representation of its frequency components in said spectrum.

6. Apparatus for reducing recurrent speed variations in a velocity servo by reducing ripple in the torque output of an electric motor included in said servo and comprising:

means, responsive to motor output speed and shaft position, for generating a synchronized reference signal at a frequency of at least one frequency component in said ripple;

means for combining said synchronized reference signal, in a ripple reducing sense, a drive current for said motor, which drive current affects the motor shaft rotation speed; and means for adjusting phase and amplitude of said synchronized signal to reduce said at least one frequency component, said amplitude and phase adjusting means including digital signal processor means comprising:

means for recurrently analyzing the frequency spectrum of said torque output; and means, operating in a successive approximation mode, and responsive to recurrent spectrum analysis of said torque output spectrum, for determining phase and amplitude adjustment values required to reduce said at least one frequency component.

7. Apparatus for reducing recurrent speed variations in a velocity servo by reducing ripple in the torque output of an electric motor included in said servo and comprising:

means, responsive to motor output speed and shaft position, for generating a synchronized reference signal at a frequency of at least one frequency component in said recurrent ripple;

means for combining said synchronized reference signal, in a ripple reducing sense, into a drive current for said motor, said combining means comprising means for connecting said motor in a velocity servo loop including an encoder, driven by said motor, and an amplification means, said loop being responsive to an output of said encoder for approximately maintaining motor speed at a predetermined reference speed; and said amplification means has an open loop bandwidth approximately an order of magnitude larger than the bandwidth of said velocity servo loop and comprises:

first amplifier means, responsive to said encoder output and a predetermined reference voltage, for producing an uncorrected error signal, said first amplifier means having its alternating current gain set to fix the overall bandwidth of said velocity servo loop and said generating means;

means responsive to said synchronized reference signal and to said uncorrected error signal for producing a ripple corrected error signal; and second amplifier means responsive to said ripple corrected error signal for producing said drive current, said second amplifier means having an open loop bandwidth aproximately an order of magnitude larger than the bandwidth of said velocity servo loop; and means for adjusting phase and amplitude of said synchronized reference signal to reduce said at least one frequency component.

8. Apparatus for reducing recurrent speed variations in a velocity servo by reducing ripple in the torque output of an electric motor included in said servo, said velocity servo including a speed and phase encoder, driven by said motor, and a power amplifier, responsive to an output of said encoder for coarsely maintaining motor speed at a predetermined reference speed;

a plurality of means, responsive to motor output speed and shaft position, for generating a plurality of synchronized reference signals, each at a frequency of a different frequency component in said recurrent ripple;

each of said generating means comprises:

means, responsive to an output of said encoder, for producing a digital signal representation of said ssynchronized reference signals, and means for converting said digital signal representation to analog signal form;

means for adjusting phase and amplitude of said synchronized reference signals;

said adjusting means comprising means for adjusting the phase of said digital signal representation and means for adjusting the amplitude of said analog signal form to reduce said different frequency component;

means are provided for summing synchronized reference signal outputs of said plurality of synchronized reference signal generating means; and means for combining an output of said summing means, in a ripple reducing sense, into a drive current for said motor.

9. Apparatus for reducing recurrent speed variations in a velocity servo by reducing ripple in the torque output of an electric motor included in said servo, said velocity servo including a speed and phase encoder, driven by said motor, and a power amplifier, responsive to an output of said encoder for coarsely maintaining motor speed at a predetermined reference speed; said apparatus comprising:

three-phase drive current input connections for said motor, and means, including said power amplifier and responsive to motor speed, for developing a three-phase alternating current drive current for said motor;

means, responsive to motor output speed and shaft position, for generating a synchronized reference signal at a frequency of at least one frequency component in said recurrent ripple, said generating means comprising means, responsive to an output of said encoder, fopr producing a digital signal representation of said synchronized reference signal, and means for converting said digital signal representation to analog signal form;

means for combining said synchronized reference signal, in a ripple reducing sense, into drive current for said motor, said combining means comprising means for providing a reference speed signal, means for summing said synchronized reference signal and said reference speed signal to produce a speed error signal, and means, in said developing means and responsive to said speed error signal, for modifying said three-phase alternating current drive current, said modifying means comprising:

an up/down counter, responsive to said motor speed for recurrently counting through a predetermined counting range;

means for separately storing digitally encoded sample values defining a first, essentially sinusoidal, alternating current wave and a second, essentially sinusodial, alternating current wave, said second wave leading said first wave in phase by 120 electrical degrees;

means for applying bit-parallel outputs of said counter to address sequentially different locations of said storing means to read out said sample values of said first and second waves;

means for separately converting said readout sample values of said first and second waves to corresponding first and second analog signal waves;

means, resposive to said first and second analog signal waves, for producing a third analog signal alternating current wave which leads said second wave by an additional 120 electrical degreees; and means for separately amplifying each of said first, second, and third analog signal waves before application to said three-phase input connections of said motor; and means for adjusting phase and amplitude of said synchronized reference signal to reduce said at least one frequency component, said adjusting means comprising means for adjusting the phase of said digital signal representation and means for adjusting the amplitude of said analog signal form to reduce said at least one frequency component.

10. A signal function generator for generating an alternating current signal wave for controlling speed of an electric motor and comprising:
    means for receiving signals indicating motor shaft position and speed variation for said motor;
    means, responsive to said signals, for generating a digital signal sample train having a frequency equal to a torque ripple frequency component in the output of said motor;
    means for adjusting phase of said of said sample train in a direction to reduce said ripple frequency;
    means for converting said phase adjusted sample train to a corresponding analog signal wave at said frequency;
    means for adjusting the amplitude of said analog signal wave in a direction to reduce said ripple;
    at least one additional set of generating means, phase adjusting means, converting means, and amplitude adjusting means, said generating means of said at least one additional set being responsive to the same signals from said receiving means but generating sample trains having different frequencies equal to different torque ripple frequency components of said motor; and
    means for summing all phase and amplitude adjusted analog signal waves from said converting means and said amplitude adjusting means to form saide alternating current signal wave for motor speed control.

* * * * *